United States Patent
Gudenburr et al.

(10) Patent No.: US 8,151,430 B2
(45) Date of Patent: Apr. 10, 2012

(54) METHOD OF INSTALLING A SELF LOCKING SHEET METAL DUCT

(75) Inventors: Douglas G. Gudenburr, Finleyville, PA (US); Vincent L. Bloom, Beallsville, PA (US)

(73) Assignee: Ductmate Industries, Inc., East Monogahela, PA (US)

( * ) Notice: Subject to any disclaimer, the term of this patent is extended or adjusted under 35 U.S.C. 154(b) by 1072 days.

(21) Appl. No.: 12/041,865

(22) Filed: Mar. 4, 2008

(65) Prior Publication Data

US 2008/0148543 A1    Jun. 26, 2008

Related U.S. Application Data

(62) Division of application No. 11/739,238, filed on Apr. 24, 2007, now Pat. No. 7,478,467.

(60) Provisional application No. 60/746,573, filed on May 5, 2006.

(51) Int. Cl.
*B23P 25/00* (2006.01)
(52) U.S. Cl. ........... 29/458; 138/166; 138/164; 138/168
(58) Field of Classification Search .......... 138/162, 138/163, 164, 166, 168; 81/8.1; 285/344, 285/349, 363, 379, 424; 29/458, 460, 527.1
See application file for complete search history.

(56) References Cited

U.S. PATENT DOCUMENTS

| | | | |
|---|---|---|---|
| 467,999 A | 2/1892 | Southard | |
| 701,468 A | 6/1902 | Clausing | |
| 1,935,690 A * | 11/1933 | Zack | 285/331 |
| 1,948,232 A * | 2/1934 | Hall | 138/163 |
| 2,038,389 A | 4/1936 | Siebenlist | |
| 2,039,886 A * | 5/1936 | Cohn | 285/330 |
| 2,147,775 A | 2/1939 | Miller et al. | |
| 2,225,556 A | 12/1940 | Delaney | |
| 2,750,211 A | 6/1956 | Curtis | |
| 2,756,778 A | 7/1956 | Curtis | |
| 2,818,084 A * | 12/1957 | Tennison, Jr. | 285/5 |
| 2,866,481 A | 12/1958 | Bratsch | |
| 2,966,259 A * | 12/1960 | Rauscher | 242/160.4 |
| 3,246,918 A | 4/1966 | Burghart | |
| 3,295,560 A | 1/1967 | Demmler | |
| 3,369,568 A * | 2/1968 | Davis et al. | 138/168 |
| 3,438,401 A * | 4/1969 | Hannes | 138/141 |

(Continued)

FOREIGN PATENT DOCUMENTS

JP     S61-111725     5/1986

(Continued)

OTHER PUBLICATIONS

Q-41-20 Robofoam Mastic Sealant, Q'SO Product Data, Dec. 1997, Q'SO Incorporated, Saginaw.

(Continued)

*Primary Examiner* — David Bryant
*Assistant Examiner* — Christopher Koehler
(74) *Attorney, Agent, or Firm* — Beck & Thomas, P.C.

(57) ABSTRACT

A circular sheet metal duct having a sealant applied across the longitudinal seam. The sealant will improve the efficiency and will reduce or eliminate air leakage from the longitudinal seam. The sealant is applied during the manufacturing processes so that an installer does not have to seal the duct work. The method of manufacturing the sealant is provided.

8 Claims, 14 Drawing Sheets

U.S. PATENT DOCUMENTS

| | | | |
|---|---|---|---|
| 4,111,143 A | | 9/1978 | Stubbings |
| 4,218,079 A | * | 8/1980 | Arnoldt ......................... 285/331 |
| 4,848,409 A | * | 7/1989 | Jahnke, Jr. .................... 138/110 |
| 4,865,890 A | | 9/1989 | Erlichman |
| 4,941,693 A | | 7/1990 | Spaude et al. |
| 5,195,789 A | * | 3/1993 | Walsh et al. .................. 285/331 |
| 5,505,230 A | * | 4/1996 | Bartholomew ............... 138/164 |
| 5,660,212 A | | 8/1997 | Elder |
| 6,279,967 B1 | | 8/2001 | Proctor et al. |
| 2001/0026048 A1 | * | 10/2001 | Proctor et al. ................ 277/603 |
| 2003/0108381 A1 | | 6/2003 | Walsh et al. |
| 2004/0218975 A1 | * | 11/2004 | Walsh et al. .................. 403/397 |

FOREIGN PATENT DOCUMENTS

JP          S61-293570          12/1986

OTHER PUBLICATIONS

The Modern Way to Seal Ductwork, Autosealer, Ductmate Industries, Inc., Mar. 6, 1986, pp. 1-6, United States of America.

T1 The New Standard for Round Air Ducts, SNIPS magazine, Apr. 2006, BNP Media, Troy, MI.

James Gerard, Declaration of James Gerard 37 CFR 1.132, May 21, 2007, pp. 1-2, Pittsburgh.

Duro Dyne Corporation, Duro Dyne Distributor Training Manual, 2005.

Cleats Manufacturing Company, Precision-Made L-Shaped Ductwork, Aug. 15, 2001.

Cleats Manufacturing Company, Precision-Made L-Shaped Ductwork, Feb. 13, 2005.

Sheet Metal Connectors, Inc., Specifications for Rectangular Duct and Fittings, Mar. 2004.

Cleats Manufacturing, Inc., Precision-Made L-Shaped Ductwork, Sep. 8, 2004.

Streimer Sheet Metal Works, Inc., Streimer Fabriduct Line, Jan. 9, 2003.

The Lockformer Company, Lockformer Product Catalog.

The Lockformer Company, Lockformer Round Oval Machines, 2004.

The Lockformer Company, Lockformer Accessory Machines and Tools Cold Sealant System, 2004.

Carlisle Hardcast, Hardcast Application Matrix, Aug. 2, 2002.

Duro Dyne Corporation, Duro Dyne Material Safety Data Sheet, Jun. 2000.

Carlisle Hardcast, Cold Seal Permanently Tacky Pumpable Seal Sealant, May 2000.

The Lockformer Company, Lockformer Round/Oval Pipe Machine, 2004.

The Lockformer Company, Lockformer HVAC Rollforming Machines, 2004.

Crown Products Company, Inc., Specification Data Sheet Model No. 201 Wallstack Duct, Jan. 15, 2003.

Seal-Tite Duct, Pipe & Fittings, Wall Stack & Wall Stack Fittings (Riser Pipe and Riser Fittings), 2006.

Deflect-O Hardware, Air Distribution Catalog, Jul. 1, 2000.

M&M Manufacturing, Rectangle Duct & Fittings, 2004.

Productions Products, Inc., Used Sheet Metal Fabricating Machinery, Parts & Supplies.

Ductmate Industries, Inc., Complaint for Patent Infringement, Aug. 12, 2010.

Gray Metal Products, Inc. and Gray Metal South, Inc., Defendants Answer to Complaint, Counterclaims, Jan. 20, 2011.

Ductmate Industries, Inc., Plaintiff's Answer to Defendants' Counterclaims and Plaintiff's Demand for Jury Trial, Feb. 7, 2011.

* cited by examiner

Table A

| static pressure | 12" unsealed | 12" sealed | 6" unsealed | 6" sealed |
|---|---|---|---|---|
| 0.5 | 1.1 | 0.02 | 0.78 | 0.02 |
| 1 | 2.4 | 0.02 | 1.97 | 0.02 |
| 2 | 4.4 | 0.02 | 4.4 | 0.02 |
| 4 | 6.5 | 0.02 | 8.7 | 0.02 |
| 6 | 7.9 | 0.05 | 11.8 | 0.03 |
| 9 | 10.3 | 0.17 | | 0.068 |
| 10 | | 0.33 | | 0.08 |

Table B

| static pressure | 12" unsealed pipe | 12" sealed pipe | 6" unsealed pipe | 6" sealed pipe |
|---|---|---|---|---|
| 0.5 | 12.29 | 1.52 | 10.27 | 1.52 |
| 1 | 18.45 | 1.52 | 16.64 | 1.52 |
| 2 | 25.30 | 1.52 | 25.30 | 1.52 |
| 4 | 31.00 | 1.52 | 36.08 | 1.52 |
| 6 | 34.31 | 2.45 | 42.29 | 1.88 |
| 9 | 39.40 | 4.64 | | 2.88 |
| 10 | | 6.56 | | 3.14 |

Table C

| Static pressure | 12" pipe | 6" pipe |
|---|---|---|
| 0.5 | 87.60% | 85.17% |
| 1 | 91.74% | 90.85% |
| 2 | 93.98% | 93.98% |
| 4 | 95.09% | 95.78% |
| 6 | 92.85% | 95.55% |
| 9 | 88.21% | |
| 10 | | |

*Fig. 15*

METHOD OF INSTALLING A SELF LOCKING SHEET METAL DUCT

CROSS-REFERENCE TO RELATED APPLICATION

This Application is a Divisional of application Ser. No. 11/739,238, filed Apr. 24, 2007, which claims the benefit of U.S. Provisional Application No. 60/746,573, filed May 5, 2006. application Ser. No. 11/739,238 and U.S. Provisional Application No. 60/746,573 are hereby incorporated by reference.

BACKGROUND OF THE INVENTION

1. Field of the Invention

This invention relates to ducts used in the heating, ventilating, exhaust and/or air conditioning fields.

2. Description of Related Art

Ducts having circular, rectangular, or other cross sectional shape are used to transport heated or cooled air or other gasses from one place to another. A typical example is heated or cooled air from an air conditioner or furnace is transported to individual locations by a duct. These types of ducts are formed from sheet metal. The sheet metal is formed into a particular shape by taking ends of the sheet metal and interlocking them.

In circular duct work it is most common to have a self locking type of seam on the duct work that is put together by an installer. Typical examples of self locking mechanisms are reeves locks and button locks.

Previously, liquid (mastic) sealant was used for sealing rectangular duct work. Rectangular duct work is typically sold made to order. Manufacturers of rectangular ducts will manufacture the duct work to the specification of the installer. Therefore when supplying sealed rectangular ductwork it is already constructed prior to being shipped and the sealant is never exposed.

Circular duct work with reeves locks or button locks is typically shipped in bundles. An installer will then remove individual pieces from the bundle and then snap the seam of the duct together via the interlocking mechanism to create a circular duct. 5' pieces are shipped with 1 piece locked with 4 pieces around it for a total of 5. 2' pieces are shipped with 1 piece locked with 9 pieces around it for a total of 10 pieces. On some small sizes, all of the pieces can be locked.

However, these types of self locking mechanisms leak and cause inefficiency. This is problematic because of the cost of energy. A liquid sealant would not work with circular duct work having a self locking mechanism because the machines that manufacture the circular ductwork are not compatible with liquid sealant. The machines that manufacture circular ducts cannot use a liquid sealant because the liquid sealant will tend to flow or string outside of the applied area and onto the forming rolls. Once on the forming rolls, the machinery will not function properly. Because circular duct is shipped in bundles, parts of the duct where the liquid sealant is applied contact other parts of the duct. This causes the liquid sealant to adhere to the interior and/or exterior of the duct. The excess liquid sealant serves as dirt collection points for ducts in service and extra cleaning requirements for the exterior of exposed duct systems. No installer would buy circular duct work with a liquid sealant because the mess created by the liquid sealant would require additional cleaning. Additionally, when circular duct work is installed it may have to be cut by the installer. The cutting is done with the self locking mechanism disengaged. It sometimes becomes necessary for the installer to engage the self locking mechanism and then to disengage it. This is not possible with the liquid sealant that has been used in square duct work. If the liquid sealant is used with circular duct having a self locking mechanism and the self locking mechanism is disengaged, the integrity of the sealant would be compromised, thus causing failure to seal when re-engaged. Additionally, the sealant will be all over the inside and outside of the duct which will contaminate the air flow and can also collect dust on both the inside and outside of the duct. The collection of dust inside the duct can lead to mold growth, potentially creating indoor air quality hazards. The excess liquid sealant on the outside of the duct creates difficulty in painting the duct or resealing the duct as it could react with paint or sealant. The liquid sealant also off gasses VOCs into the air. Therefore, the liquid sealant is not used with circular duct work and there is no known circular duct work that is sold with sealant already applied.

Currently if a self locking circular sealed system is required, the installer assembles the ductwork and then has to use additional materials, such as tape or sealant and labor to have a sealed system.

There is a need for a sealed self locking circular system that does not require the installer to seal or tape the ductwork in order to reduce energy consumption and create efficiency.

BRIEF SUMMARY OF THE INVENTION

This invention provides a sheet metal duct having a sealant and provides a method of manufacturing the sheet metal duct with the sealant. The sheet metal duct is formed by an interlocking mechanism which is made up of a female portion and a male portion on ends of the sheet metal that engage each other. Sealant is placed in either the female portion or the male portion of the interlocking mechanism. The sealant could be a foam sealant and the sealant could be a type of sealant that allows an installer to disengage and then reengage the interlocking mechanism. The sealant could also be the type that requires tape or that does not require tape. The locking mechanism could be a reeves lock or a button lock pursuant to SMACNA Rules 6a, 6b, 7 and 8.

This invention also provides for a method for manufacturing a sheet metal duct. Sheet metal having a snap lock mechanism is provided. Sealant is inserted into the snap lock mechanism. The sheet metal is then formed into a duct. The sheet metal could be provided in strips. The snap lock mechanism could be formed into the sheet metal by a forming machine. The snap locking mechanism can have a male portion and a female portion that is created by the forming machine rolls. The sealant could be inserted into the female portion. The female portion can be created by folding the sheet metal to create a fold having a gap. The forming could be done by multiple rolls, each roll forming the sheet metal further lessening the angle of the gap until the desired angle gap is created. The sealant can be inserted into the gap when the angle of the gap is between ninety (90) and ten (10) degrees. The sealant can be inserted by a nozzle in between the second ($2^{nd}$) and eighth ($8^{th}$) roll.

An object of this invention is to provide a sealed duct system directly from the manufacturer without requiring the installer to take additional steps such as applying sealant or tape.

BRIEF DESCRIPTION OF THE DRAWINGS

FIG. 15 shows tables a, b, and c showing the experimental pressure and leakage data.

DETAILED DESCRIPTION

Examples and Explanatory Definitions

Figure 1:
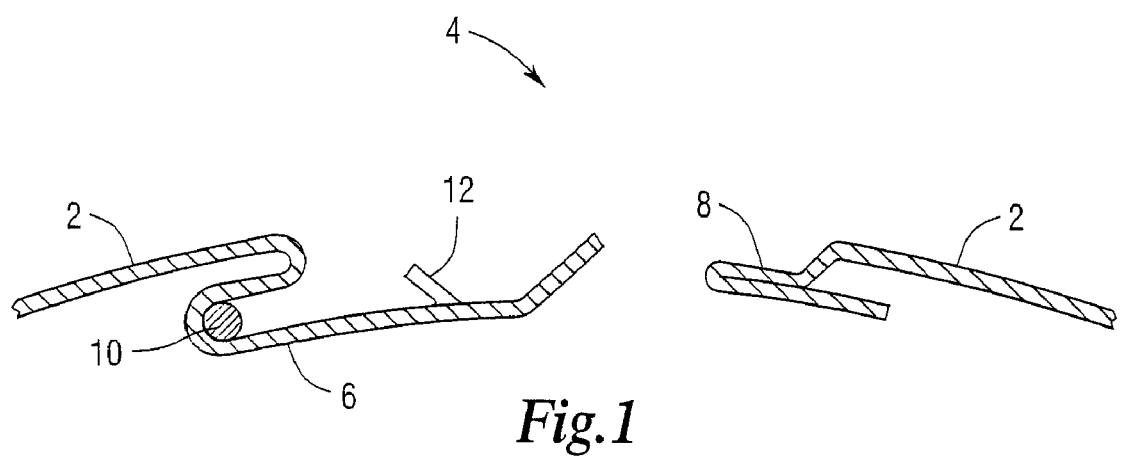
FIG. 1 shows a cross section side view of a disengaged button lock with sealant.

"sheet metal duct"—Metal in the form of a sheet that is formed into a pipe, tube, or channel that conveys a substance.

"circular sheet metal duct"—A pipe, tube, or channel that conveys air or a gas having a circular cross section. This can be round or oval.

self sealing—Sealing without the installer having to take any additional steps outside of normal installation of circular duct.

"HVAC sealant"—Something that limits air leakage through a joint.

"a liquid applied gasketing sealant"—Any sealant that is applied as a liquid and then solidifies to have sufficient compressibility so that it can form an air tight seal. After the sealant solidifies it hardens to the point where it can compress to make a seal. It is sufficiently hard so that when the self locking mechanism is engaged the sealant will not flow or displace itself out of the applied area, as would happen if a liquid sealant were used. The sealant is formulated with block co-polymers. Examples are butyl and E.P.D. M. rubbers. The sealant could also be a polyurethane foamed in place sealant. Any sealant used is applied as a liquid and forms a gasket. This type of sealant does not string like the mastic sealants do. Because the sealants do not string, this process prevents waste during the application process.

"the sealant has physical properties such that it provides a reusable seal"—A person must be able to close the snap locking mechanism that forms a sealed duct and then undo the locking mechanism and then again close the locking mechanism to create a sealed duct. It can be any sealant that has sufficient cohesive strength to be able to be used repeatedly and have sufficient compressibility so that it can form an air tight seal. The sealant must allow the lock to be able to be opened and closed repeatedly. The sealant is applied as a liquid and then solidifies. After the sealant solidifies it hardens to the point where it compresses to make a seal. There is no flow around or displacement such as when a liquid applied sealant is used.

"engaged"—The male and female portions of the locking mechanism are connected.

"disengaged"—The male and female portions of the locking mechanism are separated from the engaged position.

"reengaged"—The male and female portions of the locking mechanisms are connected after having been previously connected and disconnected.

"sealed duct"—A duct that is designed or modified through the addition of sealants to prevent or eliminate leakage of air through the seam(s) in the boundary wall of the duct.

"self locking mechanism"—Something that allows two edges of sheet metal to be joined together without a separate fastener to form a duct. The seam created by the edges is referred to as the longitudinal seam. Examples of this are a button lock and a reeves lock. (see SMACNA Rules 6a, 6b, 7 and 8)

"a female portion"—Is the part of the connection that receives the other end.

"a male portion"—Is the part of the connection that inserts into the end.

"on edges of the sheet metal"—Sides of the sheet metal that when in contact with the other forms a shape.

"the male portion engages the female portion"—When the duct is joined and formed and the edges are locked into position.

"sealant in the female portion or on the male portion"—Sealant can be added to the male or female portion.

"creating a seal between the female portion and the male portion"—Reducing the amount of air leaking from the joint.

"allows the female and male portion to disengage and reengage"—The ducts can be joined and detached as many times as necessary and the sealant retains its ability to reduce or eliminate leakage. The sealant will remain in place as it was originally applied.

"not covered by tape"—The sealant does not require a protective tape in the end product or during the production process.

"reeves lock"—The locking mechanism as shown in FIG. 1 without the button or a notch protruding from the female end. Examples of this can be seen in SMACNA RL 6A, 6B and 7.

"button lock"—The locking mechanism has a notch (or button) protruding from the female end and is of the type shown in FIG. 1. Examples of this can be seen in SMACNA RL 8.

"inserting sealant into the snap lock mechanism"—Applying sealant or a gasket to the lock mechanism.

"without the seal failing"—Minimal leakage occurring when subjected to pressures not greater than 10 inches of water column or 0.36 psi. Minimal leakage could be less than 10 cfm per linear foot.

"volatile organic compound (VOC)"—Organic chemical compounds that have high enough vapor pressures under normal conditions to significantly vaporize and enter the atmosphere. A wide range of carbon-based molecules, such as aldehydes, ketones, and hydrocarbons are VOCs. It is possible that they can be given off by applying sealant to a duct.

"forming the sheet metal into the shape of a duct"—Giving the sheet metal the desired shape of the duct.

"the exterior surface does not have sealant"—Absence of any sealant being exposed on the outer portion of the duct.

"encapsulated by the sheet metal"—Surrounded by the sheet metal sufficiently that it is not visible from the exterior of the duct or directly exposed to the airstream.

"scrap pieces"—Excess pieces of the sealant produced during the manufacturing process.

"reused in the manufacturing process"—Means that pieces can be used again in manufacturing such as reliquefying the solidified sealant so that it can then be placed in the locking mechanism.

"providing sheet metal having a self locking mechanism"—Supplying sheet metal having a joining mechanism. The sheet metal could be strips or off of a roll.

"sheet metal is provided in strips"—Cut pieces of sheet metal as opposed to coming off of a roll.

"a forming machine"—Machinery capable of forming sheet metal into a desired shape or profile. Examples of this type of machine are machines made by Nor, Maplewood, or Lockformer "machine creates using rolls"—A forming machine that uses rolls to create the desired shape or profile.

"folding the sheet metal to create a fold having a gap"—An edge of sheet metal is formed to create a space.

"each roll forms the sheet metal further lessening the angle of the gap until the desired angle"—Each forming roll further forms or changes the metal to create the desired profile.

"forming process"—Making sheet metal into a duct. A nozzle that inserts the sealant can be used in any part of the forming process.

"in between the $2^{nd}$ and $8^{th}$ roll stand"—The nozzle can be placed between the 2 and $8^{th}$ roll stand in the snap lock forming machine. The machine could be a Nor type machine.

DESCRIPTION

FIG. 1 shows the profile of a sheet metal duct 2 having a self locking mechanism 4 which as illustrated in FIG. 1 is a button lock. The self locking mechanism 4 has a female portion 6 and a male portion 8. Liquid applied gasketing sealant 10 is in the female portion 6 and is not covered by tape. FIG. 1 shows the male portion 8 and the female portion 6 disengaged. There is a button 12 on female portion 6 making the snap locking mechanism 4 a button lock. If button 12 was not there, the locking mechanism would be a reeves lock. It is understood that a person of ordinary skill in the art could alternatively place the sealant on the male portion 8.

Figure 2:
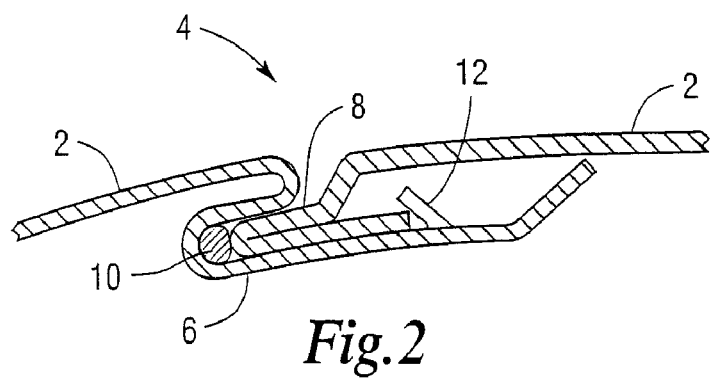
FIG. 2 shows a cross section side view of an engaged button lock with sealant.

FIG. 2 shows the profile of a sheet metal duct 2 having a snap lock mechanism with the male portion 8 engaged with the female portion 6. The liquid applied gasketing sealant 10 prevents air from escaping through the snap locking mechanism 4. The liquid applied gasketing sealant 10 is encapsulated by the sheet metal duct when the self locking mechanism 4 is engaged. The liquid applied gasketing sealant 10 creates a tight fit between female portion 6 and male portion 8 which causes a better connection for the self locking mechanism 4. The better connection of the self locking mechanism 4 reduces vibrations for the duct. When different temperature air is passed through the duct there is expansion and contraction of the duct. The liquid applied gasketing sealant 10 allows for expansion and contraction with minimal vibration because the liquid applied gaskeing sealant 10 pushes the lock into place even with contraction and expansion. It is important to get the right amount of liquid applied gasketing sealant 10 on the female portion 6 or the male portion 8. If too much liquid applied gasketing sealant 10 is applied the self locking mechanism 4 may not engage. If too little liquid applied gasketing sealant 10 is applied, the self locking mechanism 4 will not seal properly.

Because the liquid applied gasketing sealant 10 is encapsulated and does not leak out of the locking mechanism, the exterior of the duct can be painted without having to clean or prep or worry about any reaction between the liquid applied gasketing sealant 10 and the paint which can cause problems for the paint. Additionally, because the liquid applied gasketing sealant 10 is not exposed in the interior or exterior of the duct there is no chance that it will attract contaminants that can contaminate the air stream or the ductwork and/or create potential air quality concerns. The liquid applied gasketing sealant 10 does not come into contact with the air stream and does not contaminate it in any way. The liquid applied gasketing sealant 10 does not blow out or leak out when under pressure and does not drip out below a temperature of 220° F. and works at temperatures below −80° F. The liquid applied gasketing sealant 10 also has improved aesthetics compared with externally applied sealant. The liquid applied gasketing sealant 10 is not visible from the outside of the duct.

Having the liquid applied gasketing sealant 10 on the duct during manufacturing lessens the risk of human error of not sealing the metal duct 2 properly or forgetting to seal it. This invention guarantees energy efficiency because just by assembling it, the duct is being sealed. By providing for a self sealing longitudinal seam during manufacturing, it prevents the installer from doing additional work in the air with sealants that off gas (put VOCs into the air). Liquid applied sealants such as mastics can give off VOCs. The liquid applied gasketing material 10 does not collect contaminants such as dust and moisture, which can harbor mold growth. The liquid applied gasketing material 10 does not off gas during operation.

Figure 3:
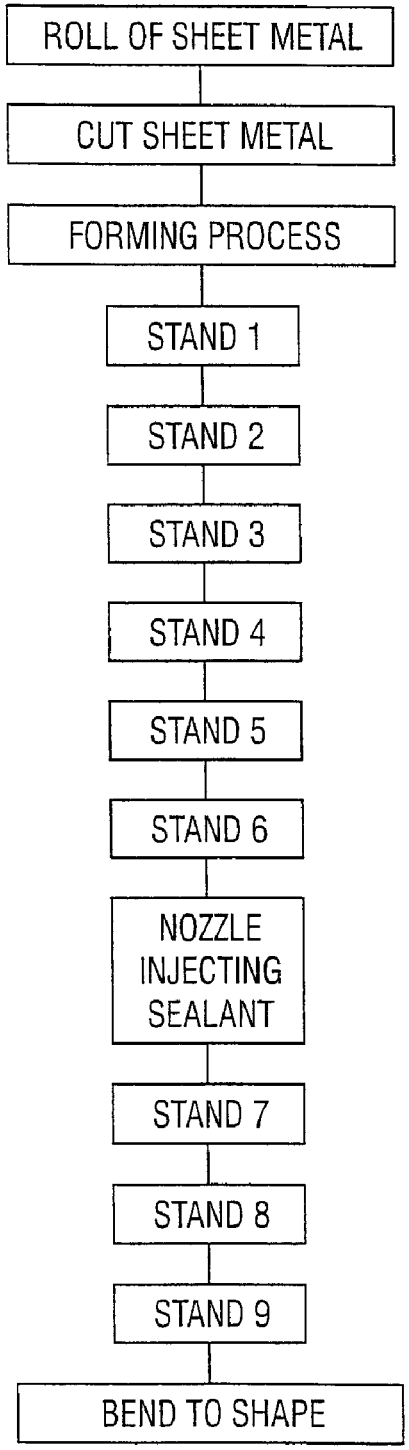
FIG. 3 shows a flow chart of the manufacturing process.
Figure 4:
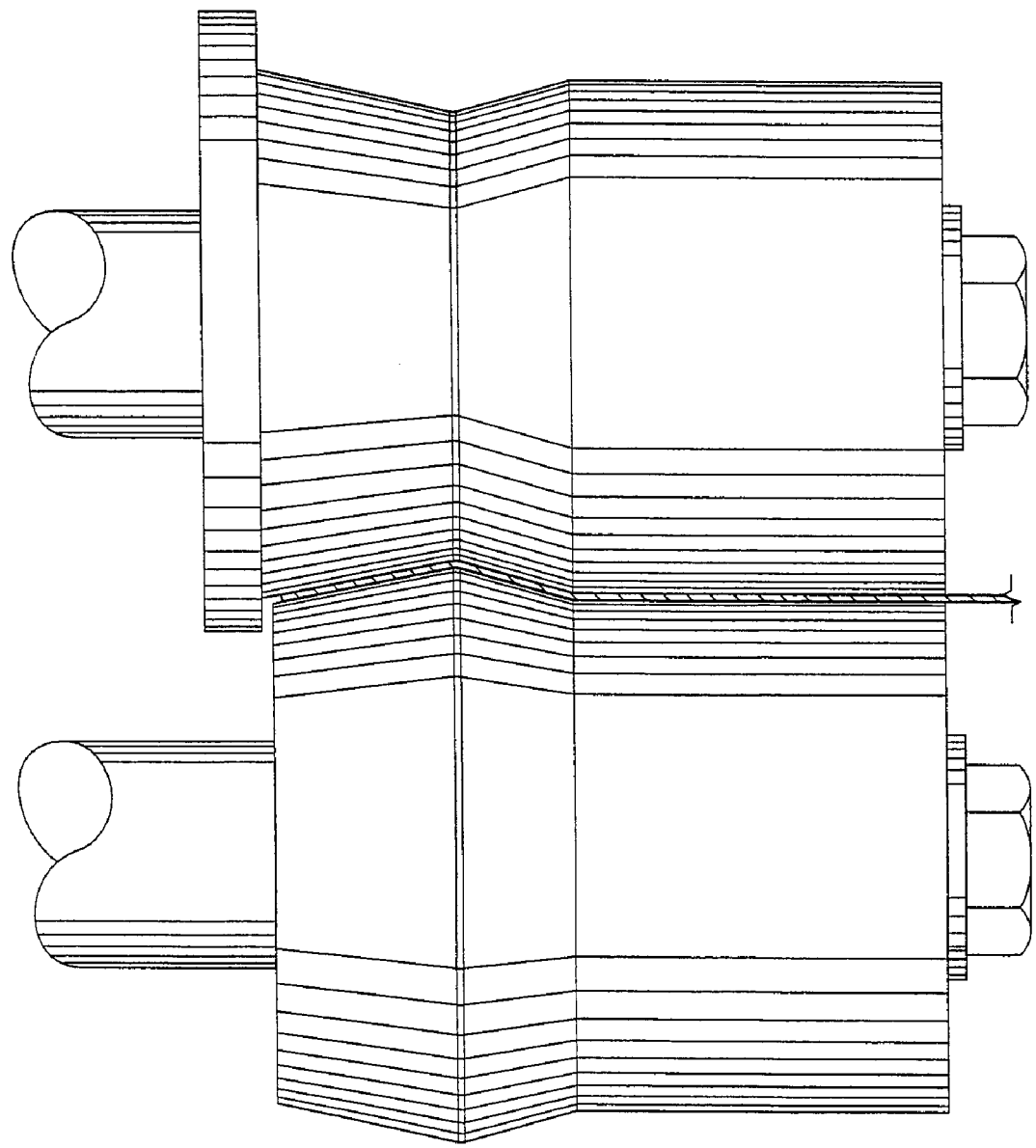
FIG. 4 shows roll stand 1 with sheet metal.
Figure 5:
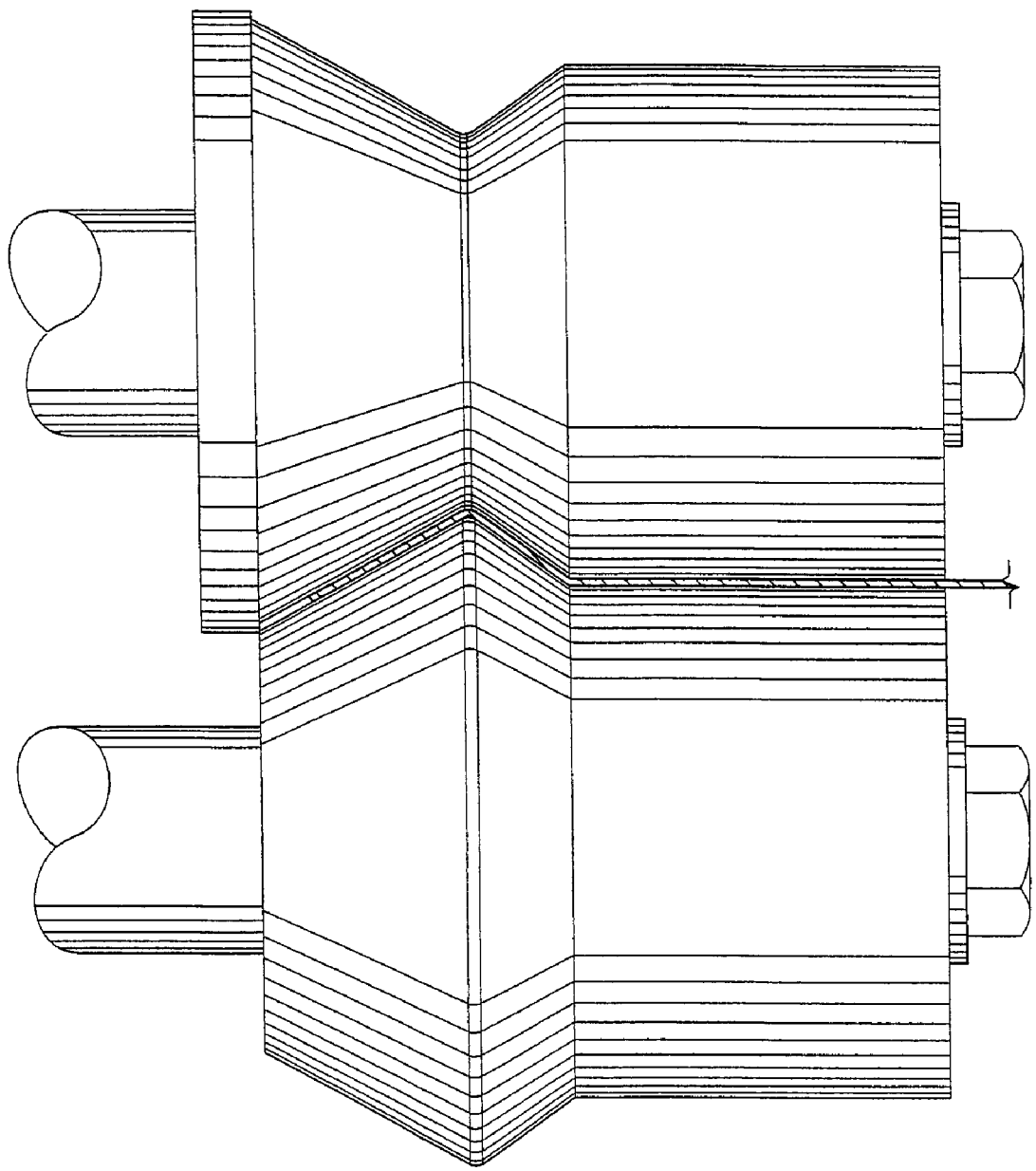
FIG. 5 shows roll stand 2 with sheet metal.
Figure 6:
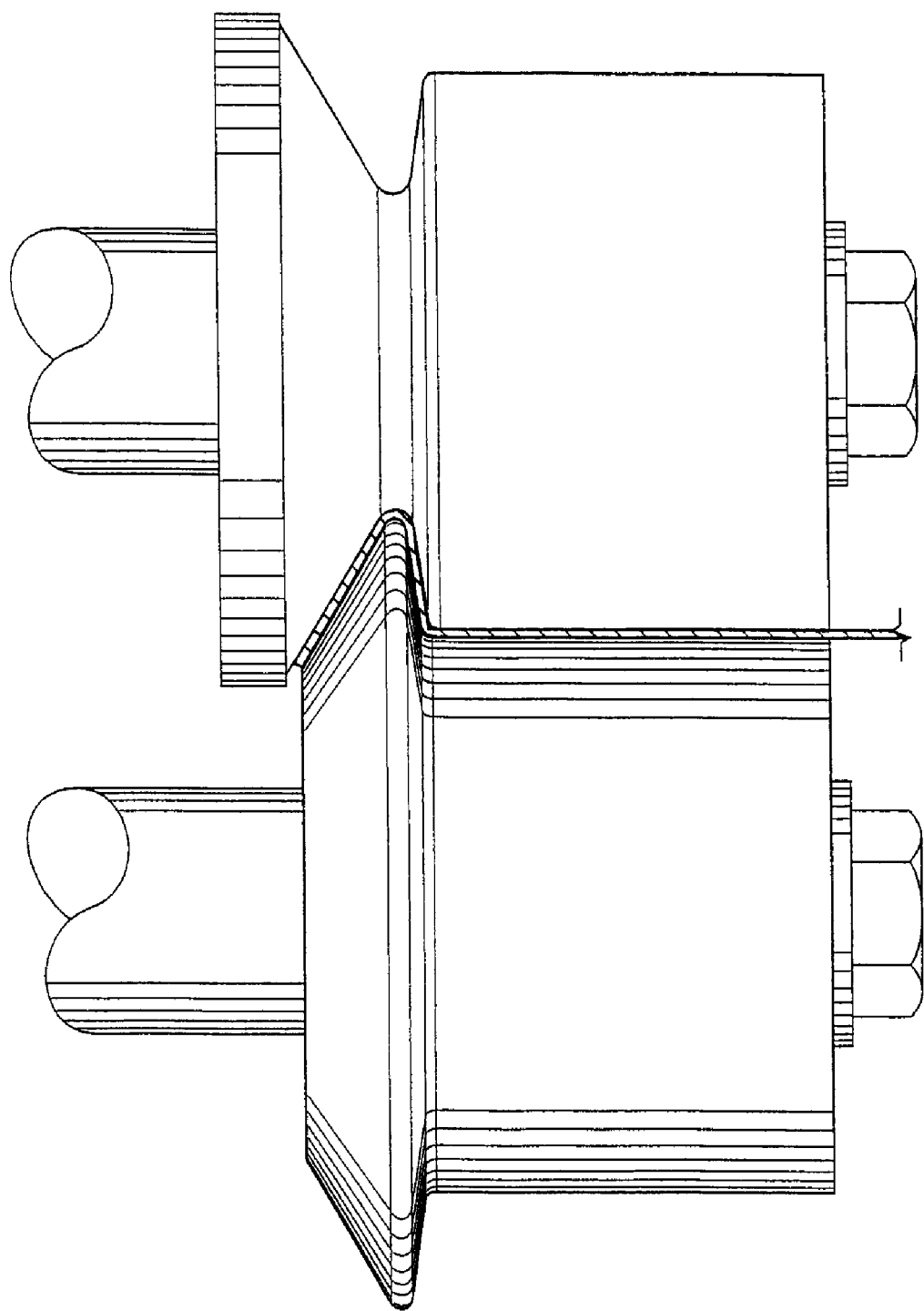
FIG. 6 shows roll stand 3 with sheet metal
Figure 7:
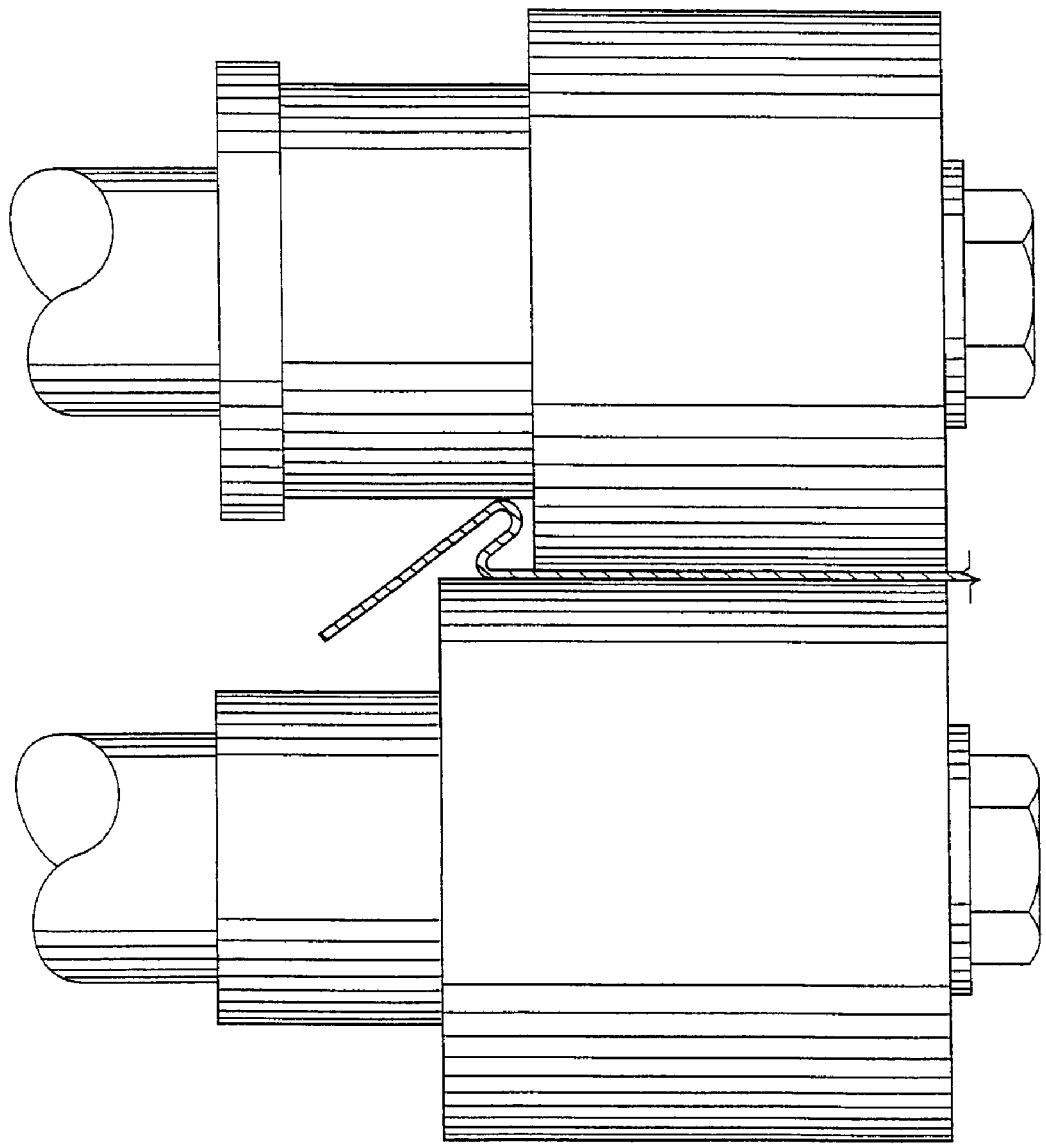
FIG. 7 shows rolls stand 4 with sheet metal.
Figure 8:
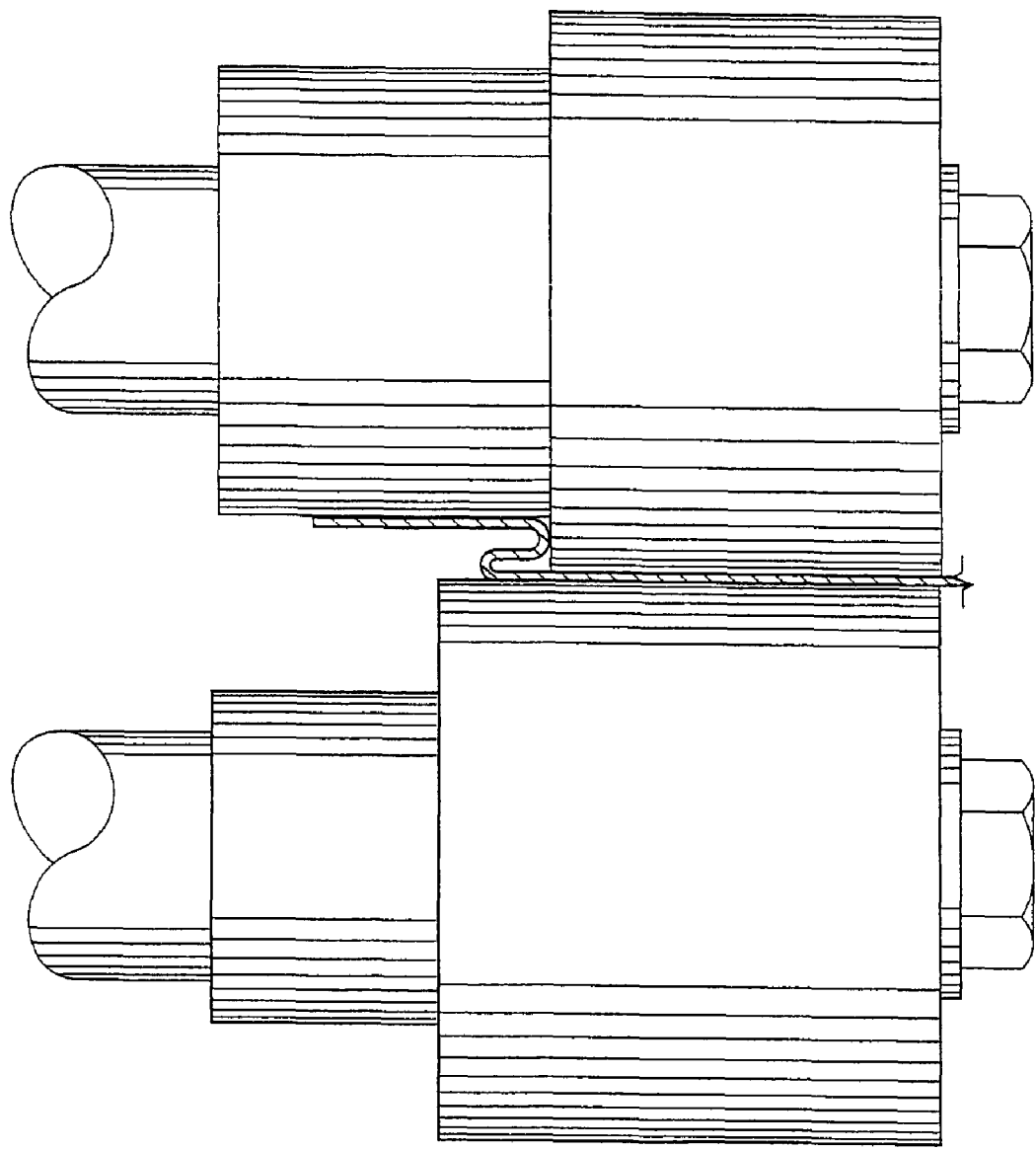
FIG. 8 shows roll stand 5 with sheet metal.
Figure 9:
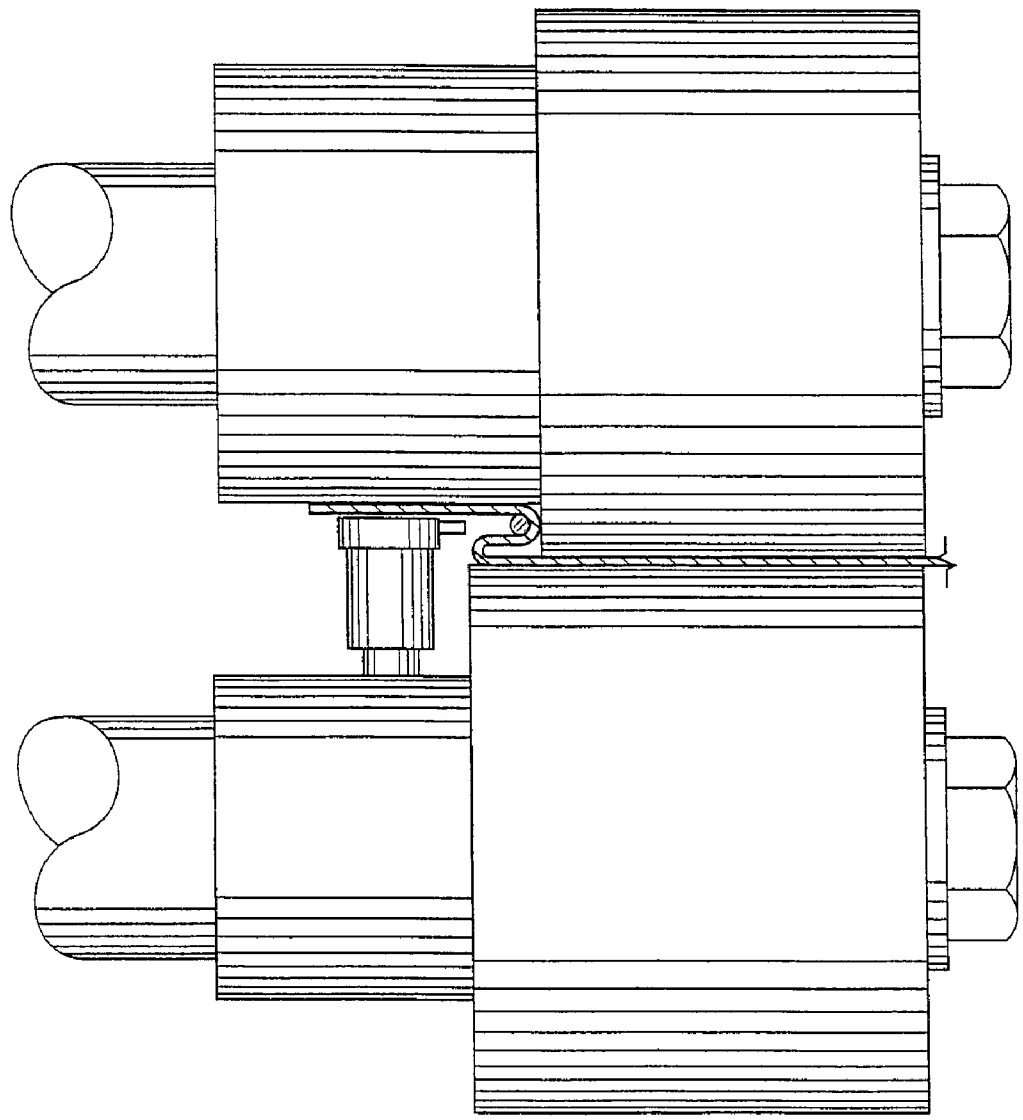
FIG. 9 shows roll stand 6 with sheet metal and the nozzle inserting the sealant in between roll stand 5 and roll stand 6.
Figure 10:
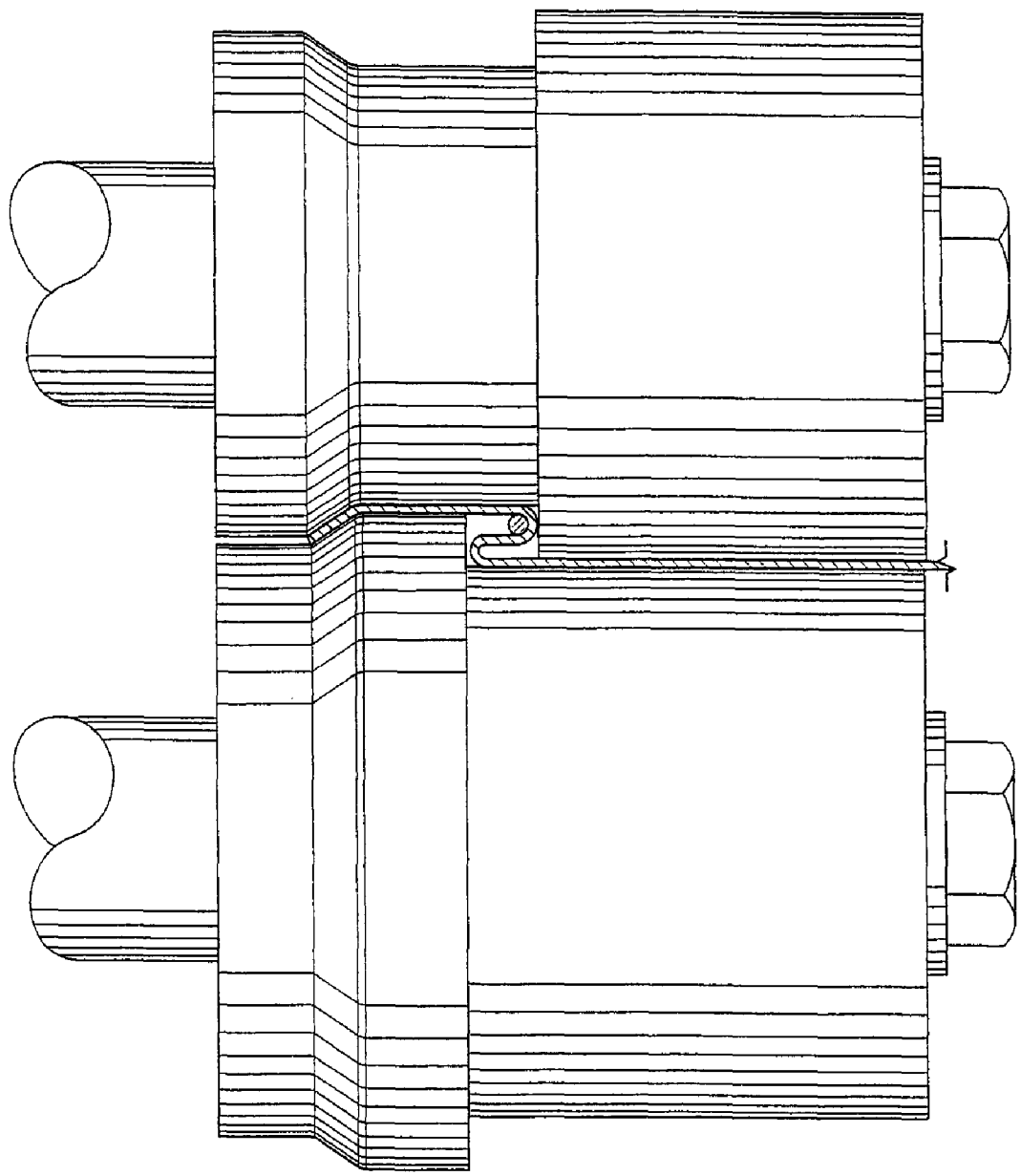
FIG. 10 shows roll stand 7 with the sheet metal having a sealant.
Figure 11:
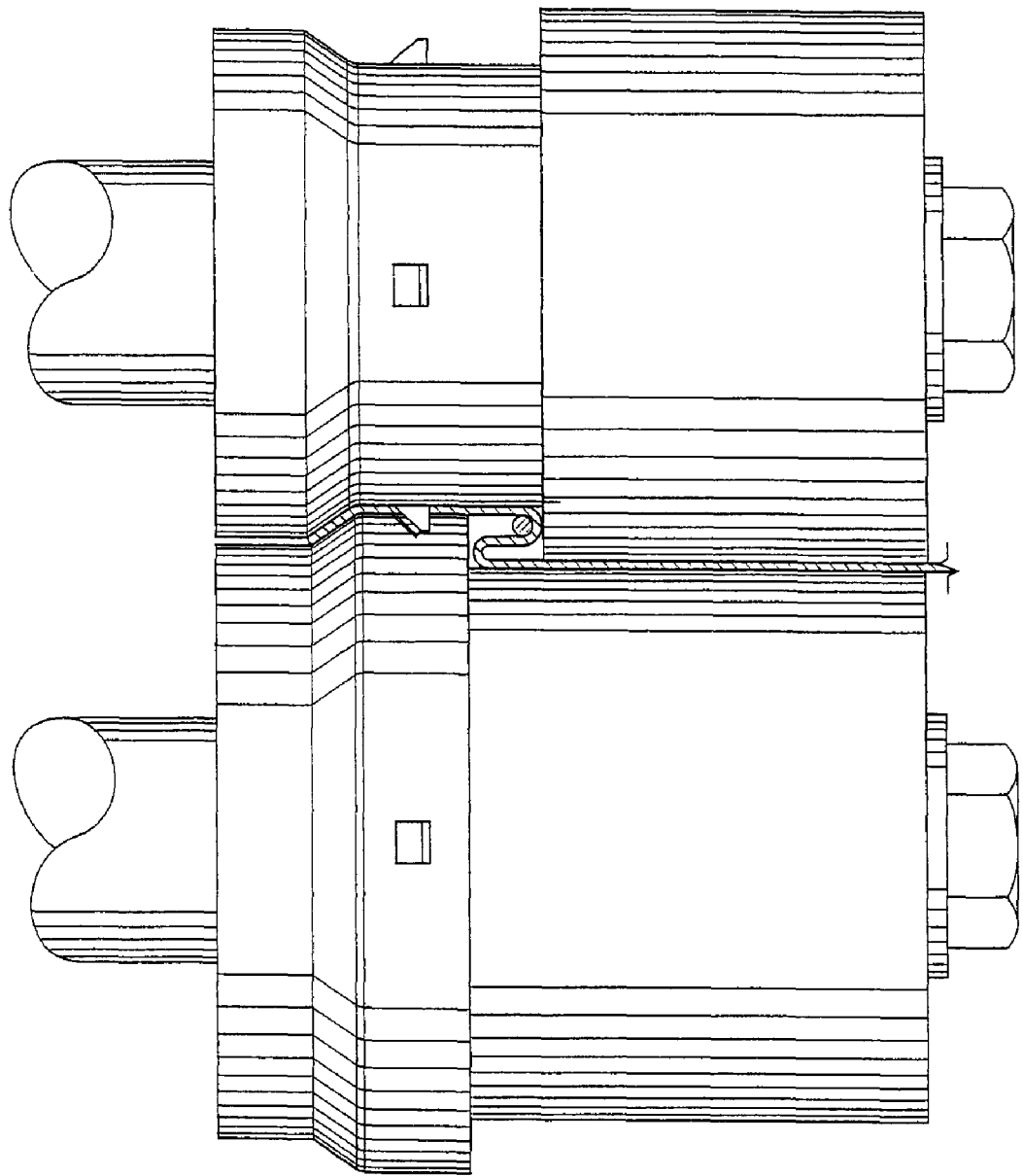
FIG. 11 shows roll stand 8 with the sheet metal having a sealant.

FIG. 3 is a block diagram showing the method of manufacturing sheet metal. Sheet metal can be on a roll. The sheet metal off of the roll is then cut to lengths. The cut lengths of sheet metal are then sent to a forming process where an interlocking mechanism is created by rolls (or stands). An injection nozzle is used to insert sealant into or onto the sheet metal. This can be done in any part of the manufacturing process. Preferably it is inserted between the $2^{nd}$ and $8^{th}$ roll stand. It could be inserted between any of $2^{nd}$, $3^{rd}$, $4^{th}$, $5^{th}$, $6^{th}$, $7^{th}$, or $8^{th}$ stand. Preferably it will be inserted when there is a gap angle between 120 and 1 degree. Most preferably it will be inserted in a gap angle between 90 and 10 degrees. Once the sheet metal passes through all of the stands and nozzles it then is formed to the desired shape of the duct.

A typical type of roll stand and how the metal is formed can be seen in FIGS. 4 through 11. It is understood to those skilled in the art that the roll forming machine has roll stands on both sides of the machine. The opposite side of the machine not shown in FIG. 4 through 11 forms the male portion 8 of the self locking mechanism 4. It is understood that a person of ordinary skill in the art could take the teachings shown and apply them so that the liquid applied gasketing material 10 could be applied on the male portion of the roll forming press.

Typically snap lock pipe is only endorsed for use in duct systems that do not exceed 2" w.c. of pressure. This is because of the leakage. The new sealed pipe is capable of much higher pressures with minimal leakage. It can hold 10 inches water column.

Figure 12:
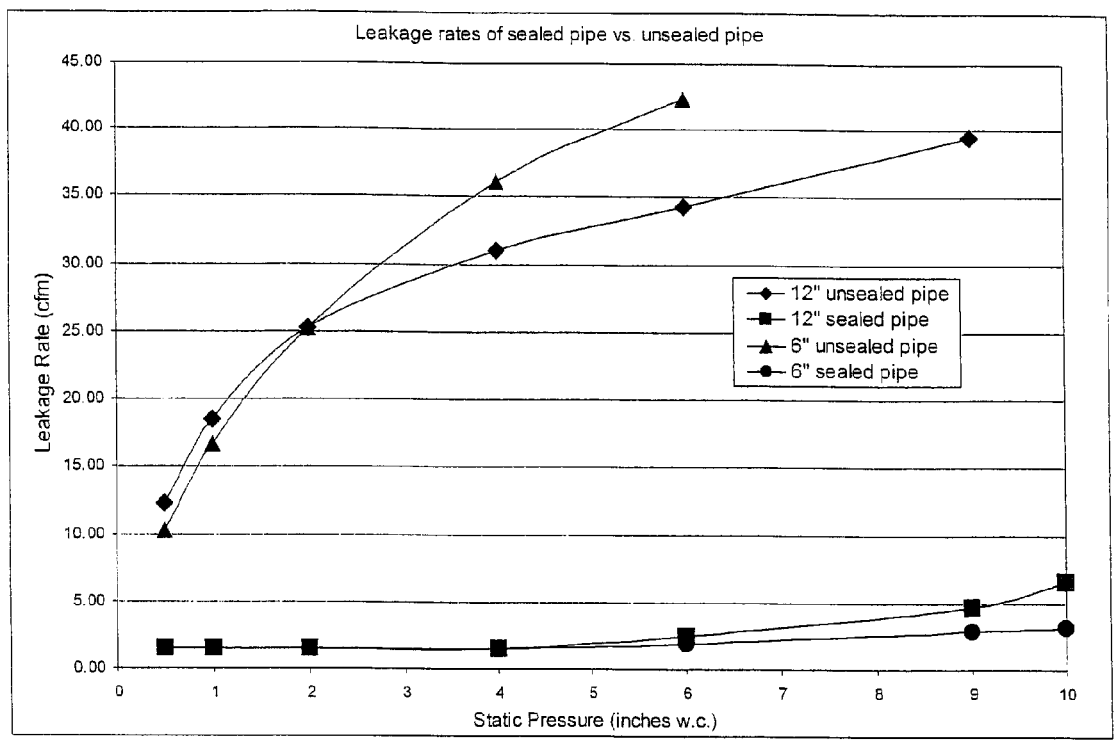
FIG. 12 is a chart of showing leakage rates of sealed vs. unsealed.

FIG. 12 shows testing results of ducts having the liquid applied gasketing material vs. ducts without the material. Each test duct consisted of ten 5' sections of pipe. The joints were sealed with sealant applied to the inside of the female connection and the outside of the male connection. The sections were fastened using 3 evenly spaced sheet metal screws. The sealant was given ample time to cure. 6" and 12" diameter pipe were tested.

The test equipment was a Merriam Instruments digital Smart Manometer and a 3" calibrated orifice tube. Testing was done at ½", 1", 2", 4", 6", and 9" positive pressures and ½" and 1" negative pressure.

Figure 13:
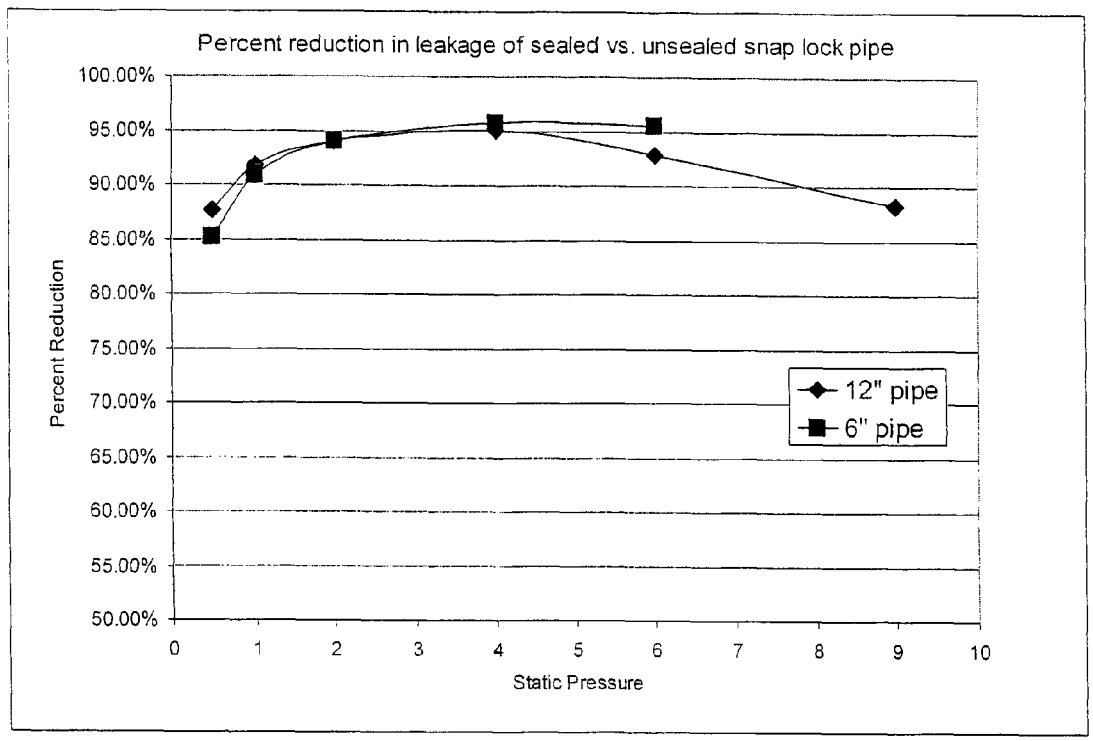
FIG. 13 is chart showing the percent leakage.

Even at lower pressures, there was a significant difference in leakage rates. At 2" w.c., the unsealed pipe leaked about 25 cfm (0.5 cfm per linear foot) compared with 1.5 cfm (0.03 cfm per linear foot) for the sealed pipe. This is about a 95% reduction in leakage. FIG. 13 shows a chart of the percentage of reduction leakage. FIG. 15 shows data tables for the testing.

Figure 14:
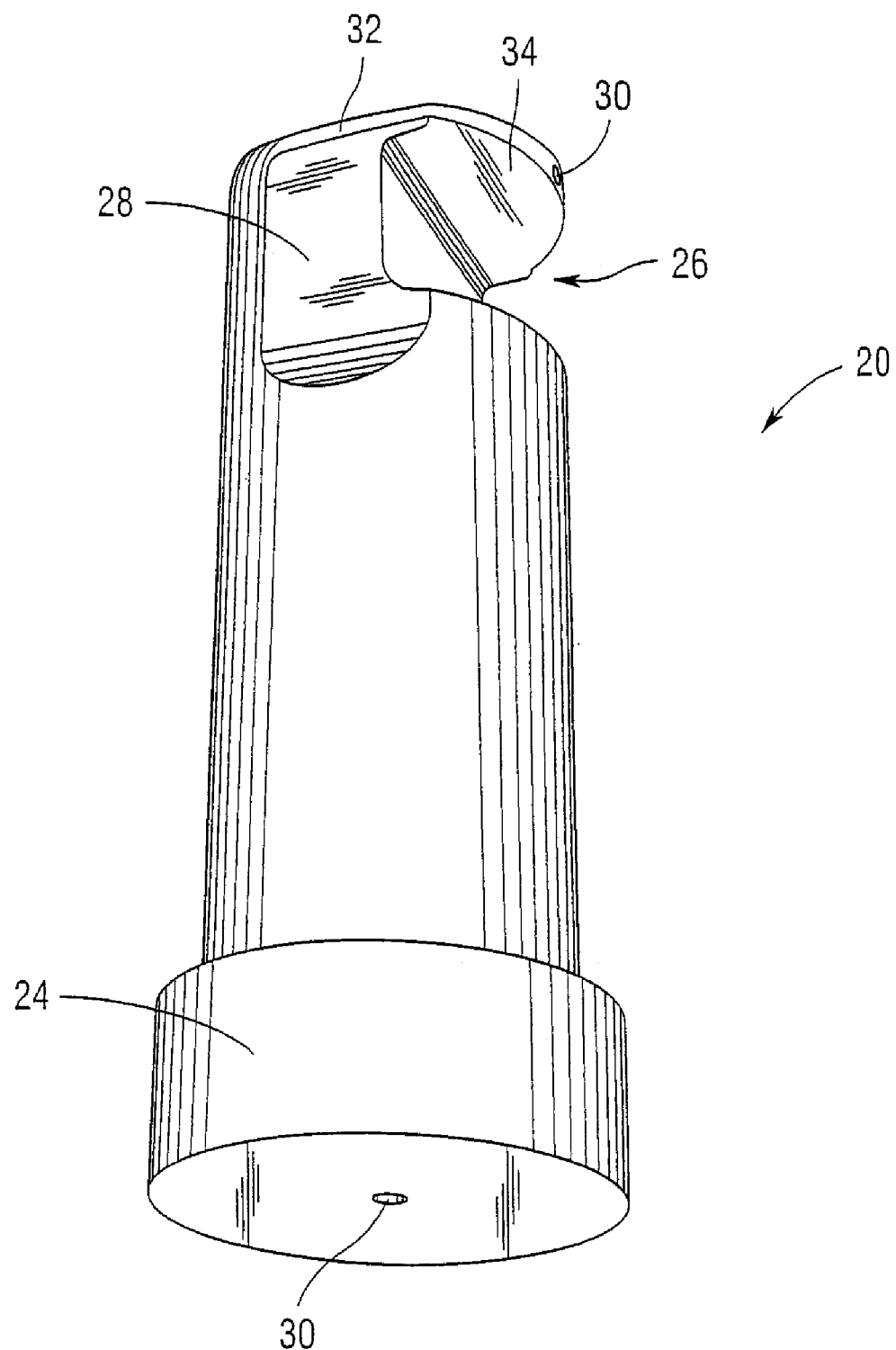
FIG. 14 is the nozzle.

FIG. 14 shows a nozzle 20. The nozzle 20 has a cylindrical body 22. The base 24 has larger diameter than the cylindrical body 22. The upper portion of the cylindrical body 22 has a cut out portion which creates a c-shaped channel 26. The c-shaped channel has notched out sides 28 (only one side is shown the other side is matching). There is a passage way 30 vertically through the cylindrical body 22 and through a vertical portion 32 of the c-shaped channel 26. The passage extends horizontally through a top horizontal section 34 of the c-shaped channel 26. The nozzle 20 is most preferable place between the $5^{th}$ and $6^{th}$ roll stand. This configuration of the nozzle 20 allows it to be placed in between the roll stands and be able to inject sealant into the fold of the ductwork.

Various changes could be made in the above construction and method without departing from the scope of the invention as defined in the claims below. It is intended that all matter contained in the above description, as shown in the accompanying drawings, shall be interpreted as illustrative and not as a limitation.

We claim:

1. A method for installing a sealed circular duct comprising:
   (a) providing a circular sheet metal duct that is self-sealing when put together by an installer having:
      (i) sheet metal;
      (ii) a self locking mechanism having a female portion and a male portion on opposite ends of the sheet metal, when the male portion engages the female portion, the circular duct is formed; and
      (iii) a liquid applied gasketing sealant in the female portion or on the male portion that is applied during manufacturing of the duct so that when the female portion and the male portion are locked together by the installer a sealed duct is created;
   (b) engaging the locking mechanism together and simultaneously sealing the longitudinal seam of the circular duct by engaging the locking mechanism without an installer using sealant; and
   (c) connecting the ductwork with other ductwork.

2. The method of claim 1 wherein the self locking mechanism is a button lock.

3. The method of claim 1 wherein the self locking mechanism is a reeves lock.

4. The method of claim 1 wherein the sealant is encapsulated by the sheet metal so that it is not exposed and does not come into contact with an air stream.

5. A method for installing a sealed circular duct comprising:
   (a) providing a circular sheet metal duct that is self-sealing when put together by an installer that was manufactured by a processes comprised of:
      (i) providing sheet metal;
      (ii) providing a snap lock mechanism on the sheet metal;
      (iii) inserting a reusable liquid applied gasketing sealant into the snap lock mechanism; and
      (iv) forming the sheet metal into the shape of a circular duct;
   (b) engaging the locking mechanism together and simultaneously sealing the longitudinal seam of the circular duct by engaging the locking mechanism without an installer using sealant; and
   (c) connecting the ductwork with other ductwork.

6. The method of claim 5 wherein the self locking mechanism is a button lock.

7. The method of claim 5 wherein the self locking mechanism is a reeves lock.

8. The method of claim 5 wherein the sealant is encapsulated by the sheet metal so that it is not exposed and does not come into contact with an air stream.

\* \* \* \* \*